United States Patent
Ouvry

(10) Patent No.: US 10,483,826 B2
(45) Date of Patent: Nov. 19, 2019

(54) THERMODYNAMIC SYSTEM FOR STORING/PRODUCING ELECTRICAL ENERGY

(71) Applicant: BOREALES ENERGY, Herouville-Saint-Clair (FR)

(72) Inventor: Patrick Ouvry, Herouville-Saint-Clair (FR)

(73) Assignee: BOREALES ENERGY (FR)

( * ) Notice: Subject to any disclaimer, the term of this patent is extended or adjusted under 35 U.S.C. 154(b) by 0 days.

(21) Appl. No.: 15/027,145

(22) PCT Filed: Oct. 1, 2014

(86) PCT No.: PCT/FR2014/052484
§ 371 (c)(1),
(2) Date: Apr. 4, 2016

(87) PCT Pub. No.: WO2015/049461
PCT Pub. Date: Apr. 9, 2015

(65) Prior Publication Data
US 2016/0248299 A1    Aug. 25, 2016

(30) Foreign Application Priority Data

Oct. 3, 2013  (FR) ..................... 13 59614

(51) Int. Cl.
*H02K 7/18*    (2006.01)
*F01K 3/12*    (2006.01)
(Continued)

(52) U.S. Cl.
CPC ............. *H02K 7/1807* (2013.01); *F01K 3/12* (2013.01); *F01K 7/38* (2013.01); *F01K 25/08* (2013.01);
(Continued)

(58) Field of Classification Search
CPC ........... H02K 7/1807; F01K 3/12; F01K 7/38; F01K 25/08
(Continued)

(56) References Cited

U.S. PATENT DOCUMENTS 4,015,962 A    4/1977   Tompkins
4,058,979 A    11/1977  Germain
(Continued)

FOREIGN PATENT DOCUMENTS

CN    2 089 148 U    11/1991
CN    102840000      12/2012
(Continued)

OTHER PUBLICATIONS

International Search Report dated Feb. 17, 2015 for International Application No. PCT/FR2014/052484.
(Continued)

*Primary Examiner* — Viet P Nguyen
(74) *Attorney, Agent, or Firm* — Fay Sharpe LLP

(57) ABSTRACT

A system for producing and storing electrical energy includes a thermally insulated chamber containing a first circuitry in which circulates a first working fluid, a hot source, a cold source, wherein the hot source is composed of a pure water ice slurry at 0° C., the cold source is composed of an ice slurry with a temperature lower than or equal to −40° C. and the system for producing/storing electrical energy further includes a second circuitry of working fluid for circulating a second working fluid between the hot source and a thermostat, wherein the second working fluid is circulated between said thermostat and the hot source by an auxiliary expansion valve and an auxiliary compressor.

9 Claims, 6 Drawing Sheets

(51) Int. Cl.
  *F01K 7/38* (2006.01)
  *F01K 25/08* (2006.01)
  *F25B 27/00* (2006.01)

(52) U.S. Cl.
  CPC ....... *F25B 27/00* (2013.01); *F25B 2313/0271* (2013.01); *F25B 2400/14* (2013.01); *F25B 2400/24* (2013.01)

(58) Field of Classification Search
  USPC .............................................. 290/1 A, 1 R, 2
  See application file for complete search history.

(56) References Cited

U.S. PATENT DOCUMENTS

| | | | |
|---|---|---|---|
| 4,476,851 A | 10/1984 | Brugger et al. | |
| 8,484,986 B2 | 7/2013 | Waibel | |
| 2003/0101728 A1* | 6/2003 | Wakana | F02C 6/14 60/727 |
| 2004/0088992 A1 | 5/2004 | Brasz et al. | |
| 2004/0184923 A1* | 9/2004 | Iwanami | B60H 1/3223 417/221 |
| 2007/0051103 A1* | 3/2007 | Bar-Hai | F02G 5/02 60/517 |
| 2009/0179429 A1* | 7/2009 | Ellis | F01K 3/12 290/1 R |
| 2009/0241546 A1* | 10/2009 | Hegazy | F01K 9/003 60/670 |
| 2010/0071368 A1* | 3/2010 | Kaplan | F01K 7/025 60/651 |
| 2010/0176602 A1* | 7/2010 | Shinnar | F03G 6/04 290/1 A |
| 2010/0251712 A1* | 10/2010 | Nakhamkin | F01K 3/12 60/659 |
| 2010/0300775 A1* | 12/2010 | Dravis | F01D 1/023 180/2.2 |
| 2011/0100611 A1 | 5/2011 | Ohler et al. | |
| 2011/0204655 A1* | 8/2011 | Waibel | F25B 6/04 290/1 R |
| 2011/0233934 A1* | 9/2011 | Crane | F04B 17/02 290/52 |
| 2012/0006023 A1* | 1/2012 | Johnson | F01K 3/12 60/645 |
| 2012/0324892 A1 | 12/2012 | Tai et al. | |
| 2013/0118170 A1* | 5/2013 | Mierisch | F01K 3/006 60/659 |
| 2014/0175799 A1* | 6/2014 | Tabe | F03D 9/002 290/55 |
| 2015/0211386 A1* | 7/2015 | Howes | F01K 3/02 60/650 |

FOREIGN PATENT DOCUMENTS

| | | |
|---|---|---|
| DE | 10 2004 030 367 A1 | 1/2006 |
| DE | 10 2005 014 959 A1 | 10/2006 |
| EP | 1 925 475 A2 | 5/2008 |
| EP | 2 532 843 A1 | 12/2012 |
| GB | 2 088 547 A | 6/1982 |
| WO | WO 99/22188 | 5/1999 |
| WO | WO 2012/075583 A1 | 6/2012 |

OTHER PUBLICATIONS

Written Opinion dated Feb. 17, 2015 for International Application No. PCT/FR2014/052484.
French Search Report dated Jun. 16, 2014 for Application No. FR 1359614.

* cited by examiner

THERMODYNAMIC SYSTEM FOR STORING/PRODUCING ELECTRICAL ENERGY

FIELD OF INVENTION

The invention relates to the field of energy storage, and more particularly to an electrical energy storage/production system.

BACKGROUND

The storage of electricity has become a major issue of stability of the electricity grids in the short and medium terms. Historically, the electricity grids were designed to be "downstream" that is to say to go from big power plants to the consumers. Everything was therefore dimensioned (production and distribution) according to this unidirectional pattern and with a control of the productions to match as closely as possible the demand for electricity.

In the last few years, due to the rarefaction of fossil fuels on the one hand and to their harmful effects on the environment on the other hand, new electricity production means have been introduced in the energy mix, based primarily on renewable energies.

But one of the characteristics of these new production tools implemented heavily is their variability, even their intermittence. Certainly these energies are predictable in the short and medium terms, but they are irregular, and contrary to the historical production means, they cannot be controlled. Furthermore, as yet totally devoid of any storage means, these new tools must feed their electricity into the distribution grid according to their production, in real time.

The result of this variability is the need to make use of the storage means (mainly hydraulic) and of some power plants whose production is highly reactive, such as oil or gas-fired power plants, to ensure at all times the balance between supply and demand for electricity. But this exercise has its limitations because the hydraulic storage reached saturation and flame production tools have non-zero startup times and costs, leading the power plant operators to subsidize operators to consume the electricity rather than having to stop these power plants and to restart them shortly after. This operation meets a physical need for preservation of grids which, without this operation, would see the voltage and/or frequency of their electricity fluctuate outside the tolerances.

It is to avoid this type of operations that all the energy players have started looking for new electricity storage tools which can be mobilized rapidly and on a large scale.

Many techniques are contemplated such as the improvement of the hydraulic storage, the storage by compressed air, the electrochemical storage, by hydrogen storage or by flywheel.

However, these various techniques are limited by a lack of operating sites (hydraulic) or by problems of still too high costs (electrochemistry, hydrogen or flywheel) and again for many years.

There is also the hardly used way of storing electricity thermodynamically, field in which many innovations are in preparation, by coupling refrigeration cycles and organic Rankine cycles (ORC for short).

However, these new systems and methods have many drawbacks.

For instance, the hot and cold sources are made of non-constant storage temperature materials. Moreover, these systems have many exchanger stages, which is detrimental to efficiencies, too low to contemplate an industrial exploitation.

To improve efficiencies, it is useful to use hot sources and cold sources with constant temperatures and heat exchangers immersed in these sources.

This is particularly the case of the U.S. Pat. No. 8,484,986, relating to electricity storage systems by thermodynamic means, comprising a heat exchange circuit between a cold source and a hot source with constant temperatures, allowing in a charge cycle to store electrical energy and in a discharge cycle to generate electrical energy.

SUMMARY

Although this U.S. Pat. No. 8,484,986 constitutes real progress in electricity storage by thermodynamic means, the described system can be improved by using a storage material whose phase change takes place at a temperature lower than the room temperature.

The present invention relates to an electricity storage system comprising a refrigerating circuit and an ORC circuit (separate or joint), the exchangers of which are immersed in the cold and hot sources made of phase change materials (PCM) with temperatures lower than or equal to 0° C., the temperature difference between the cold source and the hot source being at least 20° C. In the present application, the expression "working fluid" refers to a refrigerant fluid, that is to say a pure fluid or a mixture of pure fluids in a liquid phase, gas phase or both at the same time, depending on the temperature and pressure thereof. This fluid can be used as well for a positive work as for a negative work, and is often referred to as "organic fluid". Non-limiting examples of such fluids can be hydrofluorocarbons (HFC), perfluorocarbons (PFC) or perfluorated hydrocarbons, hydrocarbons or organic compounds which are not part of the previously cited categories, inorganic compounds such as ammonia or $CO_2$, or mixtures thereof.

The present invention relates to a system for producing/storing electrical energy, comprising a thermally insulated chamber containing a first closed circuitry in which circulates a first working fluid, a hot source through which a first leg of the first circuitry passes for a heat exchange between the first working fluid and the hot source, a cold source through which a second leg of the first circuitry passes for a heat exchange between the first working fluid and the cold source, the hot and cold sources being thermally insulated from each other, the first circuitry further comprising third and fourth legs connecting in series the first and second legs, the third leg comprising a first member for circulating the first liquid working fluid and the fourth leg comprising a second member for circulating the first gas working fluid, characterized by the fact that the hot source is composed of a pure water ice slurry at 0° C., the cold source is composed of an ice slurry with a temperature lower than or equal to −40° C. and the system for producing/storing electrical energy further comprises a second circuitry of working fluid for circulating a second working fluid between the hot source and a thermostat, wherein the second working fluid is circulated between said thermostat and the hot source by an auxiliary expansion valve and an auxiliary compressor, and is caused to exchange heat therewith.

The term "thermostat" refers to a system with a constant temperature, for example the outside air outside the chamber of the system, a water reserve, a water stream/water course/ waterway near the system, with which it is easy to exchange heat through the second circuitry to maintain the hot source at 0° C.

The thermostat temperature will generally be slightly higher than that of the hot source, but may also, under certain climatic conditions, be equal to or lower than the temperature of the hot source, without departing from the scope of the present invention.

It will possible in particular to obtain an optimal operation of the system according to the invention with a thermostat temperature close to zero degree Celsius.

The second fluid circuitry can be directly connected to the first circuitry to form a single closed circuit, in which case the first and second working fluids are identical, or on the contrary be closed and independent from the first fluid circuitry, without departing from the scope of the present invention.

The use of water, pure or salted, for both the hot source and the cold source, allows to obtain constant temperatures for both the hot and cold sources, during a charge cycle (storage) and during a discharge cycle (production).

In addition, the main constituent of the hot source and of the cold source being water, the manufacturing cost of the device according to the invention is reduced compared to prior art devices.

Water also has the advantage of having a very high thermal storage power and great thermal transfer power.

Finally, by the temperature of the hot source at 0° C., advantage can be taken of the particular properties of phase change of water at that temperature, allowing to further improve the heat exchanges between the working fluid and the hot source, but also and especially to significantly increase the thermal energy storage capacity (the latent heat of fusion is significantly higher than the sensible heat).

Other phase change materials, for example alcohols, could be used in the context of the present invention for the cold source, the temperature thereof being impacted accordingly (methanol: −90° C., ethanol: −117° C.)

According to a first embodiment, the first fluid circulating member is a pump, optionally reversible, and the second circulating member is a reversible turbine.

The device according to the invention can thus be totally reversible, usable both for storing electrical energy in the trough consumption periods, and for producing electrical energy, in the peak consumption periods.

It could also be contemplated, without departing from the scope of the present invention, to have a pump and a turbine on each leg, for an also reversible operation with two different apparatuses (compressor and turbine) connected in parallel by leg, without departing from the scope of the present invention.

According to another embodiment, a low temperature regenerator is provided to enable a heat exchange between the legs entering and exiting the cold source.

The heat exchange efficiency of the overall system is thus increased.

Indeed, during a discharge cycle, the low temperature working fluid cools, through the low temperature regenerator, the working fluid which enters the cold source, so as to consume as little ice as possible in the cold source.

A high temperature regenerator may be provided between the legs entering and exiting the second circulating member.

According to another embodiment, a superheating member providing an external heat, especially a waste heat, is provided on the first fluid circuitry immediately upstream of the input of the second circulating member in its electricity production mode.

In particular, the external heat can be supplied by any device producing waste heat, in particular a heat engine, a generator unit, a gas turbine, etc., and should be as high as possible.

According to a particular feature of the invention, the temperature of the superheating member is between 100° C. and 300° C. For instance, for a diesel engine, the temperature is ideally of 160° C. and for a gas turbine, the temperature is ideally of 260° C.

The superheating member enables to bring calories to overheat the gas working fluid, that is to say, to increase its potential energy before expansion, and therefore to increase the overall efficiency of the system during a discharge.

According to another embodiment, a compressor assembly is provided on a fifth circuitry leg in parallel to the fourth leg.

This compressor assembly, which may consist of a compressor or several compressors in parallel, can enable, for example by being powered by a renewable electricity source (wind turbine) the load of the cold source with ice without consuming power from the electrical network.

An expansion valve assembly can be provided on a sixth circuitry leg in parallel to the third leg, when the first circulating member is not a reversible pump.

The fifth and sixth legs can be directly connected to the first circuitry, or the fifth and sixth legs form with a seventh leg passing through the hot source and an eighth leg passing through the cold source a third closed circuitry independent from the first circuitry and parallel thereto, in which circulates a third working fluid.

According to another embodiment, the system further comprises a source at an intermediate temperature between the temperature of the hot source and that of the cold source, a fourth fluid circuitry carrying a fourth working fluid comprising a leg passing through each of the sources to exchange heat with them, the intermediate temperature source being connected to the fourth circuitry in parallel to the hot source, by a leg equipped with a compressor and a leg equipped with an expansion valve, and in parallel to the cold source, by a leg equipped with a compressor and a leg equipped with an expansion valve.

The presence of an intermediate temperature source allows for a so-called "staged" compression, that is to say, to divide the compression in two distinct steps and to stay as close as possible to the working fluid saturation curves (saturated liquid state, saturated gas state). This results in a better overall efficiency of the complete cycle.

According to a particular feature, the intermediate temperature source is made of an ice slurry at a temperature between −15° C. and −30° C., preferably −21° C.

The intermediate temperature source is made of a phase change material, in particular an eutectic mixture of water and sodium chloride (sea salt).

According to another embodiment, the same working fluid circulates in the first circuitry and the fourth circuitry which form a single closed circuit. There is thus only one exchanger by source.

According to another embodiment, the first circuitry and the fourth circuitry are independent. It is therefore possible to use a more suitable working fluid for the turbine (for example, $CO_2$) and another working fluid for the fourth circuitry, thereby increasing the overall efficiency, but this requires having two exchangers by source.

According to another embodiment, the cold source is made of an eutectic mixture of water and calcium chloride.

The system according to the present invention thus allows, with the same device, a storage and a production of electric energy at low cost. In addition, the system is responsive.

Although this is not specified, the system is connected to a local or interconnected electrical grid, to store energy during a charge phase, and to produce it during a discharge phase.

Advantageously, the system chamber can be for example a container, be placed near a waste heat source and a thermostat, and contain the one or more circuitries and different sources, the chamber being connected to an electrical grid which can be a local or interconnected grid.

The system according to the invention is then easily displaceable and mobilizable.

The system can then be used as a source of additional electricity, storing energy during the through consumption periods, and producing electricity during the peak consumption periods.

Another advantage of the system of the invention is that, contrary to electrochemical systems, there is no loss in efficiency over time due to chemical deterioration of the components, through the use of water for the sources.

Finally, also due to the use of water, the system is non-polluting, and its dismantling does not require any costly transformation of its constituent materials.

According to an embodiment, the first circuitry and the second circuitry are connected into a single closed circuitry, the first and second working fluids constituting a single working fluid for the assembly comprising the first and second circuitries.

According to an embodiment, at least one compressor of the compressor assembly is equipped with a rotor provided with blades and is driven directly by the mechanical energy of the wind, or is equipped with a rotor driven by a pneumatic or hydraulic circuit actuated by a water-pumping windmill, the rotor being then indirectly driven by the mechanical energy of the wind.

The invention also relates to an electricity production/storage method using the system as described above, to produce electricity from the ice of the cold source and store electricity in the form of ice in the cold source.

The electricity production method consists in actuating the working fluid circulating members of the above-described system so that the working fluid evaporates in the exchanger immersed in the hot source (causing the formation of ice crystals in the hot source), passes through the second working fluid circulating member wherein it expands to produce electricity, and condenses in the exchanger immersed in the cold source, melting ice crystals in the cold source.

The electricity storage method consists in actuating the working fluid circulating members of the above-described system so that the second working fluid circulating member operates as a compressor and causes the working fluid to evaporate in the exchanger immersed in the cold source (causing the formation of crystals in the cold source), the working fluid being then condensed in the exchanger immersed in the hot source (melting ice crystals in the hot source), before being expanded by the first working fluid circulating member operating as an expansion valve.

BRIEF DESCRIPTION OF THE DRAWINGS

In order to better illustrate the subject-matter of the present invention, an embodiment will now be described hereinafter, for illustrative and not limitative purposes, in conjunction with the accompanying drawings.

In these drawings.

DETAILED DESCRIPTION OF THE INVENTION

Figure 1:
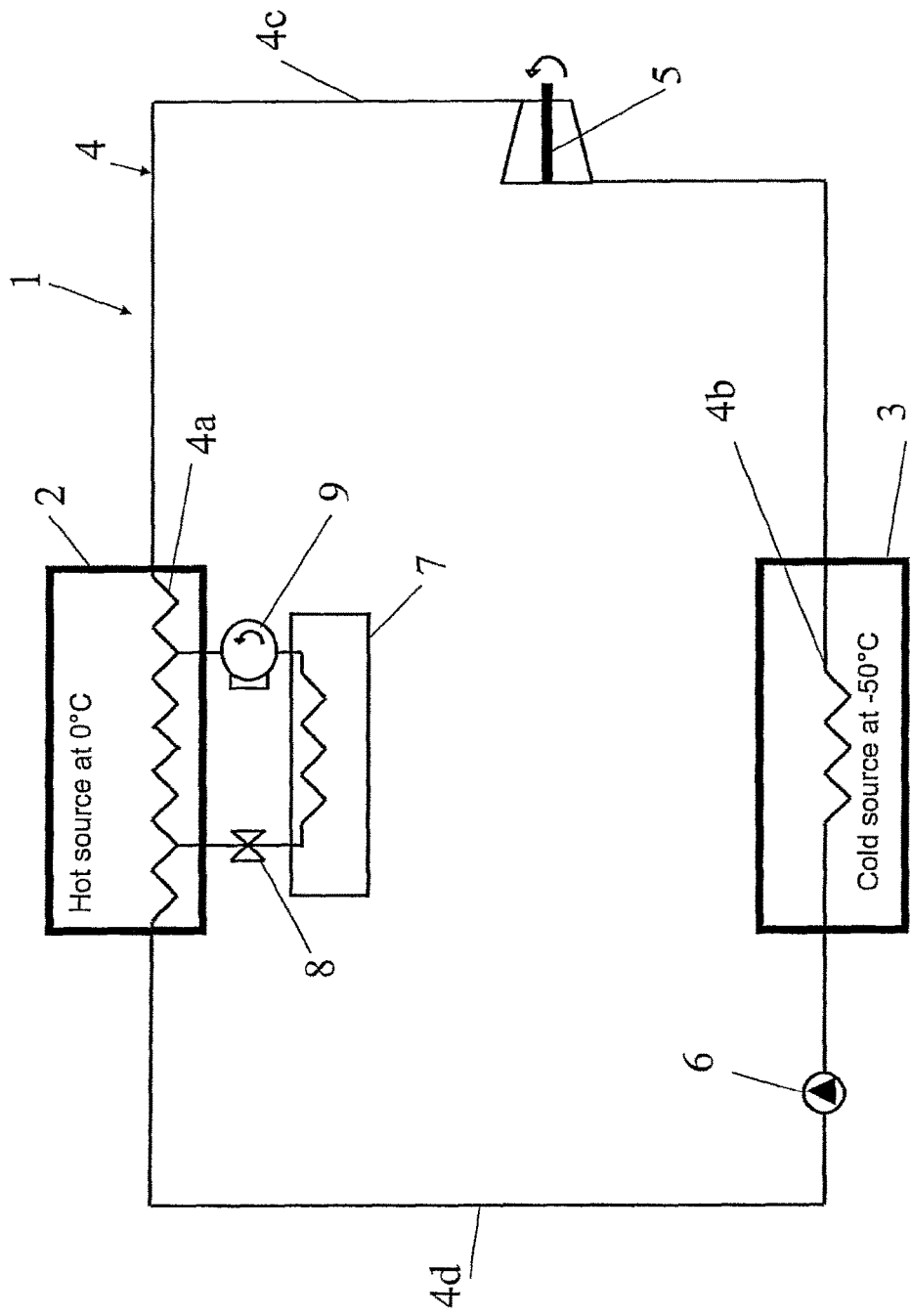
FIG. 1 is a diagram of an electrical energy storage/production system according to a first embodiment of the present invention.

In the following detailed description, the same reference numerals denote the same structural elements.

When referring to FIG. 1, it can be seen that there is shown a system 1 for storing/producing electrical energy according to a first embodiment of the invention.

The system 1 includes a hot source 2, a cold source 3, both thermally insulated (and in particular from one another), a circuit 4 comprising a portion 4a of heat exchange with the hot source 2 and a portion 4b of heat exchange with the cold source 3.

The hot source 2 is made of a pure water ice slurry at 0° C., the cold source 3 being made of an ice slurry at −50° C., comprising an eutectic mixture of water and of calcium chloride.

A reversible turbine 5 is provided on the leg 4c of the circuit 4 connecting the hot source 2 to the cold source 3, and a reversible pump 6 is provided on the other leg 4d of the circuit 4 connecting the cold source 3 to the hot source 2.

The turbine 5 and the pump 6 being reversible, the system 1 can be used to store electrical energy (charge) or to produce electrical energy (discharge).

The system 1 further comprises an element 7, acting as a thermodynamic thermostat, at a temperature generally higher than that of the hot source 2, to exchange heat therewith, via an auxiliary expansion valve 8 and an auxiliary compressor 9.

The element 7 may also be at a temperature lower than or equal to that of the hot source 2, without departing from the scope of the present invention.

The working fluid used in the circuit 4, as well as in the circuit connecting the hot source 2 and the element 7, is a refrigerant fluid, for example R410A or $CO_2$, without these two examples being limitative.

Although it is not shown to avoid overloading the drawing, the system 1 further comprises a thermally insulated sealed chamber containing the circuit 4, the hot source 2, the cold source 3, the turbine 5, the pump 6. The auxiliary compressor 9 and the auxiliary expansion valve 8 may be inside the chamber but are, preferably, outside, connected thereto in a sealed manner. The element 7 is an exchanger immersed in a substantially constant temperature fluid, for example outside air or water (waterway/waterstream or water body) or another fluid at a temperature higher than that of the hot source 2.

The chamber may for example consist of a sealed container, the chamber comprising means for connecting the system 1 to a local or interconnected electrical grid, so that the system 1 can exchange electric energy with the outside.

The system 1 has two operating modes, the turbine 5 and the pump 6 having a reversible operation.

In a first operating mode (charge or storage), the turbine 5 operating as a compressor causes the working fluid to evaporate in the exchanger immersed in the cold source 3 (causing the formation of crystals in the cold source 3), the working fluid then condensing in the exchanger immersed in the hot source 2 (melting ice crystals in the hot source), before being expanded by the pump 6 operating as an expansion valve.

In a second operating mode (discharge or production), the working fluid evaporates in the exchanger immersed in the hot source 2 (causing the formation of ice crystals in the hot source 2), passes through the turbine 5 where it expands to produce electricity, and condenses in the exchanger immersed in the cold source 3, melting ice crystals in the cold source 3.

Thus, in the system 1 according to the invention, the electricity storage results in the formation of ice in the cold source 3 and the electricity production results in the consumption of ice in the cold source 3, the quantity of ice in the hot source 2 being regulated by heat exchange with the assembly 7.

Figure 2:
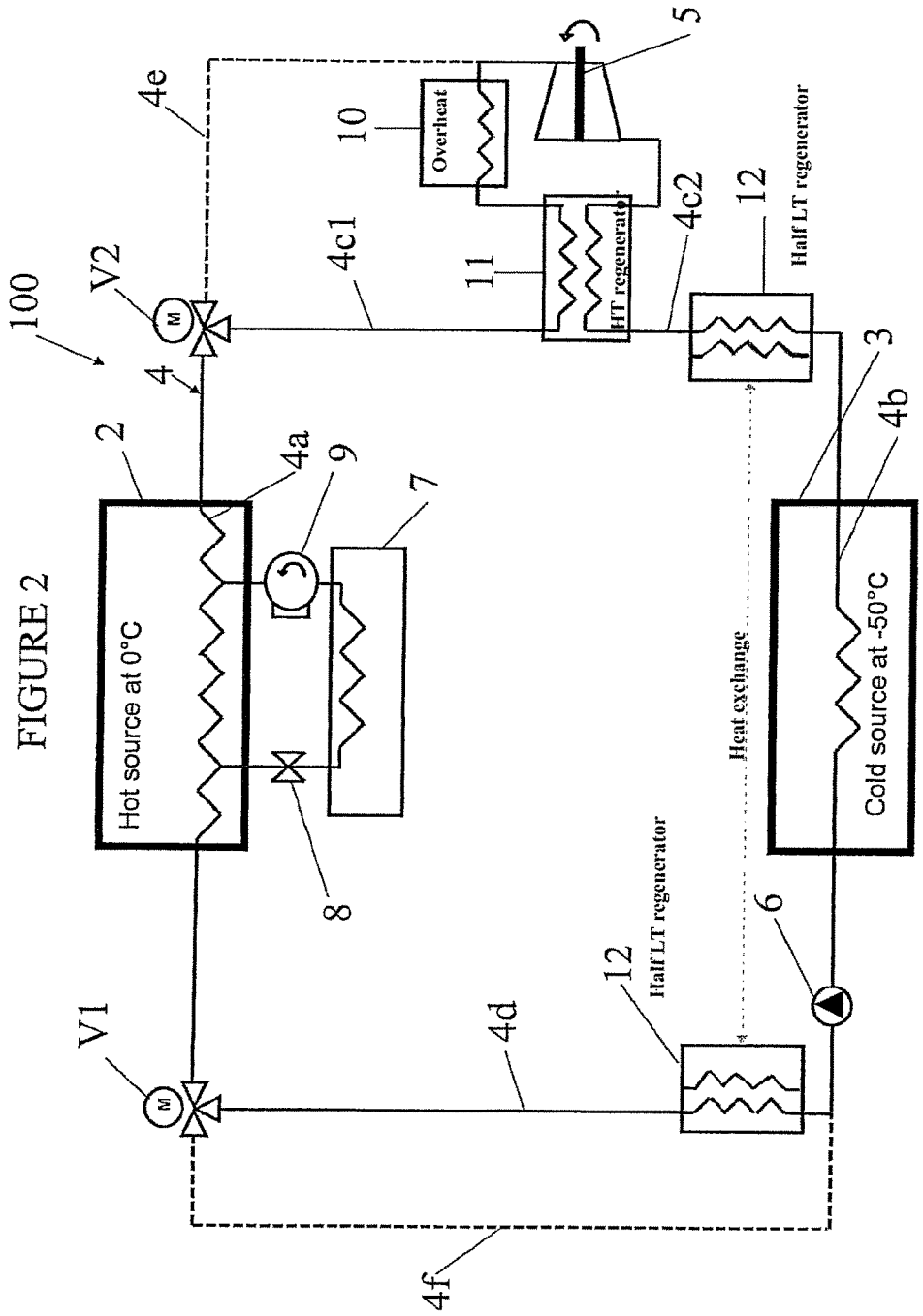
FIG. 2 is a diagram of an electrical energy storage/production system according to a second embodiment of the present invention.

When referring now to FIG. 2, it can be seen that there is shown a system 100 according to another embodiment. The common elements with the embodiment of FIG. 1 are not described again here, only the elements which differ between the two embodiments being described thereafter.

In this second embodiment, the leg 4c of the first embodiment is divided into two sub-legs 4c1 and 4c2 separated by a high temperature regenerator 11 and legs 4e and 4f are added, respectively in parallel to legs 4c1, 4d of the circuit 4.

In addition, a superheating member 10, positioned upstream of the turbine 5, is used to heat the working fluid prior to its expansion in the turbine 5, in the discharge operating mode of the system 100, in order to increase the efficiency of the system 100. The superheating member 10 heats the working fluid from a waste heat source of diesel engine or generator type (not shown), the temperature of the superheating member 10 being about 160° C. (diesel engine) or 260° C. (gas turbine).

Further, the high temperature regenerator 11 on the leg 4c1 of the circuit 4 and a low temperature regenerator 12 (shown in two separate parts to avoid overloading the reading of the Figure), provided on the legs 4c2 and 4d of the circuit 4, also allow to increase the efficiency of the system 100 by improving the heat exchange of the working fluid.

The three-way valves V1 and V2 allow, as in the system 1, a reversible operation of the system 100 in charge or discharge.

In the charge mode, the working fluid flows in the legs 4e, 4a, 4f, 4b and 4c2, the turbine 5 operating as a compressor, the operation being similar to that described in relation to the first embodiment.

In the discharge mode, the working fluid flows in the leg 4c1, in the high temperature regenerator 11, in the superheating member 10, in the turbine 5, and then through the high temperature regenerator 11 in the leg 4c2, the low temperature regenerator 12, the leg 4b, the pump 6, the low temperature regenerator 12, the legs 4d and 4a, the operation being similar to that described for the first embodiment.

Thus, the working fluid only passes through the superheating member 10 in the discharge operation.

It is understood that in this embodiment, the regenerators 11, 12 improve efficiency, but are optional, and a system similar to the system 100, in which the regenerators 11, 12 are absent also falls within the scope of the present invention.

The low temperature regenerator 12 serves to cool the gas working fluid entering the cold source 3 during the discharge phase, using, in steady state, the cold liquid working fluid leaving the cold source 3 for cooling the gas working fluid entering therein, in order to consume as little ice crystals as possible in the cold source 3.

Figure 3:
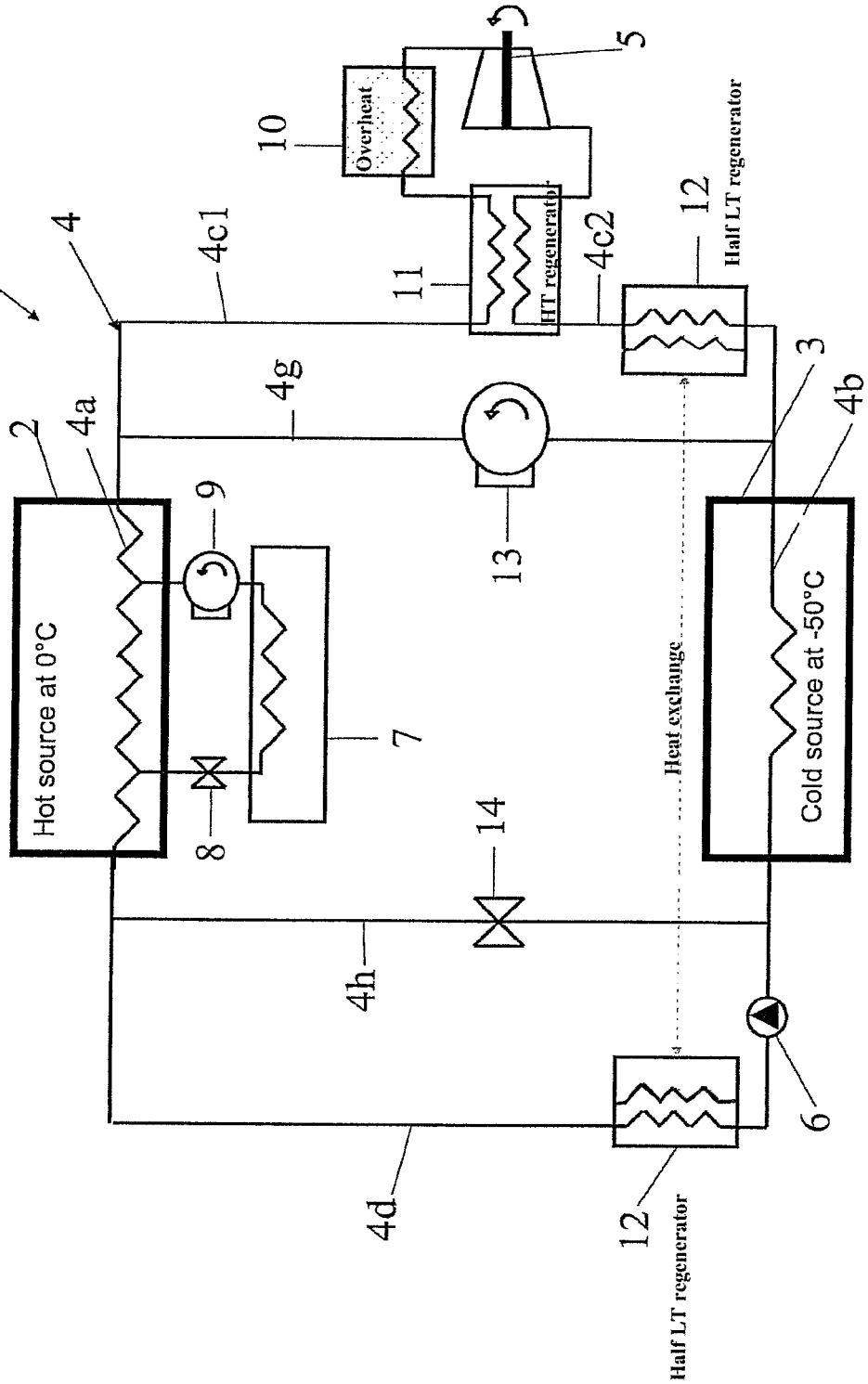
FIG. 3 is a diagram of an electrical energy storage/production system according to a third embodiment of the present invention.

Referring now to FIG. 3, it can be seen that there is shown a system 200 according to a third embodiment.

This system is similar to the system 1 of FIG. 1, the leg 4c of FIG. 1 being, as with the second embodiment, divided into two sub-legs 4c1 and 4c2 and connected to the turbine 5 by a high temperature regenerator 11.

As with the second embodiment, a superheating member 10 is connected to the turbine 5.

Furthermore, a leg 4g, on which is mounted a compressor 13 is provided in parallel to the legs 4c1 and 4c2 and a leg 4h, on which is mounted an expansion valve 14, is provided in parallel to the leg 4d.

The operation of the system 200 of FIG. 3 is essentially identical to the operation of the system 100 of FIG. 2.

The leg 4g plays the same role as the leg 4e in FIG. 2, the compressor 13 being for recharging the cold source 3 with ice crystals during a charge cycle.

The compressor 13 may be a single compressor, but can also be a set of compressors in parallel.

The compressor can be in particular driven by a renewable energy source such as a wind turbine (or several wind turbines in parallel) that uses renewable energy (wind) to recharge the cold source 3 without having to take electricity from the grid as in the system 100 of FIG. 2. Thus, the mechanical energy of the wind can be directly transformed into ice without passing through the electric vector, thus avoiding conversion losses.

The leg 4h is then used, with the expansion valve 14, to circulate the working fluid during the charge cycle, onto the legs 4g, 4b, 4h and 4a. However it is to be noted that this leg 4g carrying the expansion valve 14 may be omitted if the pump 6 is reversible, as in the preceding embodiments.

The discharge operation is the same as in FIG. 2, the working fluid passing through the leg 4c1, the high temperature regenerator 11, the turbine 5, the leg 4c2, the low temperature regenerator 12, the leg 4b, the low temperature regenerator 12, the legs 4d and 4a, and will not be further described here.

Figure 4:
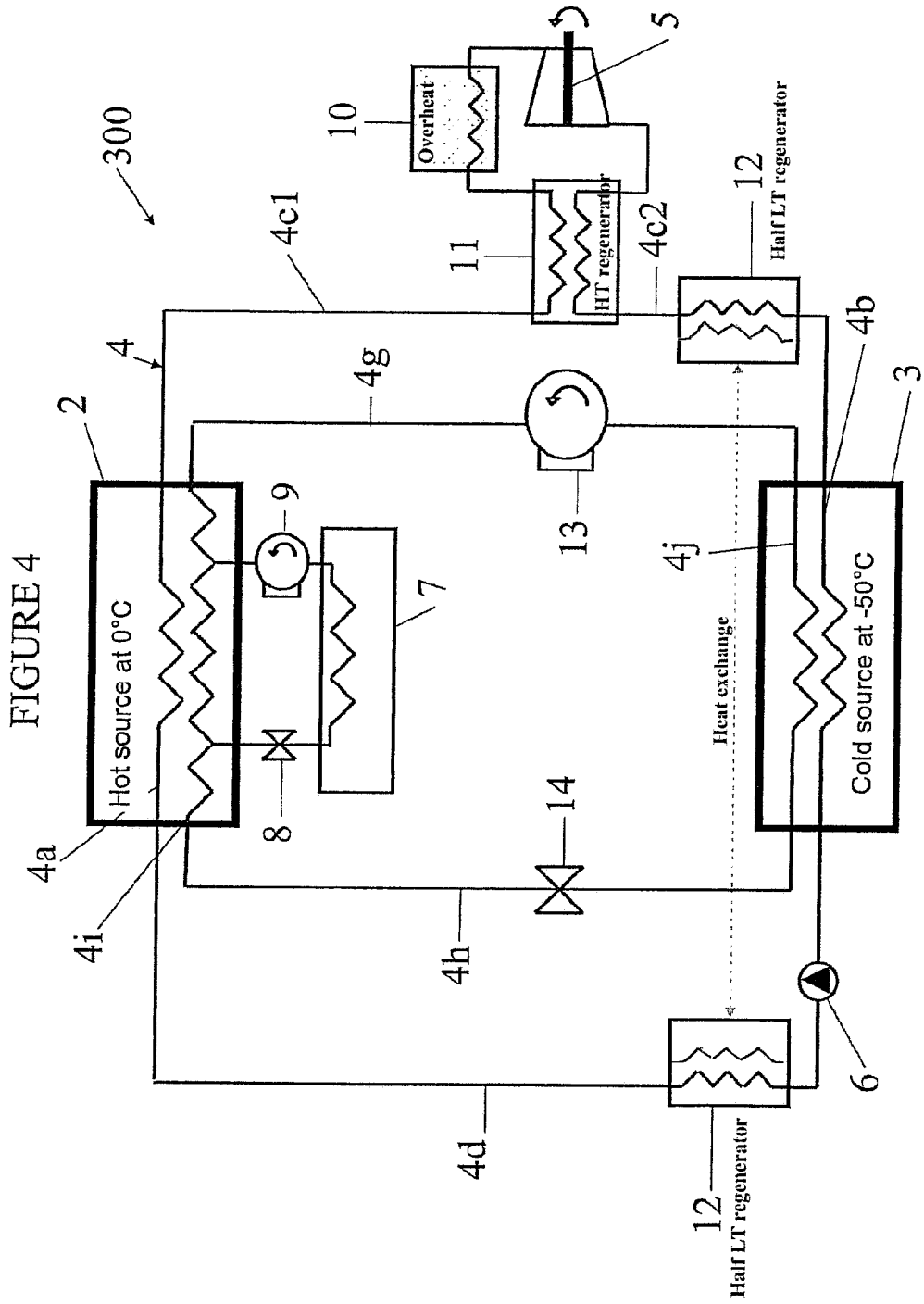
FIG. 4 is a diagram of an electrical energy storage/production system according to a fourth embodiment of the present invention.

FIG. 4 shows a fourth embodiment of a system 300 according to the invention.

The system 300 comprises two legs 4g and 4h, respectively in parallel to the legs 4c1, 4c2 and 4d, and two legs 4i, 4j connecting the legs 4g and 4h in series, the two legs 4i, 4j passing through the hot 2 and cold 3 sources, similarly to the legs 4a and 4b.

Each leg 4g, 4h carries, as in the previous embodiment, a compressor 13, or respectively an expansion valve 14.

There are therefore two parallel circuits, one for the charge cycle (legs 4i, 4g, 4j and 4h), the other for the discharge cycle (4a, 4c1, 4c2, 4b and 4d), the operation being otherwise similar to the one of the previous embodiment and therefore not described again here.

It should be noted that in this embodiment, the pump 6 may be reversible, but is not necessarily reversible. The expansion valve 14 is necessary in this embodiment, unlike the previous embodiment, because in this embodiment, the charge and discharge circuits are independent.

Moreover, the element 7, auxiliary expansion valve 8 and auxiliary compressor 9 circuit was connected for illustrative and not limitative purposes to the circuit 4i, 4g, 4j and 4h in this embodiment as an example, but it is understood that it could also have been connected to the circuit 4a, 4c1, 4c2, 4b and 4d without departing from the scope of the present invention. This element 7, auxiliary expansion valve 8 and auxiliary compressor 9 circuit could also, as in all other embodiments, be a circuit independent from the other circuits, since functionally its role is limited to exchange heat with the hot source 2, without departing from the scope of the present invention.

Figure 5:
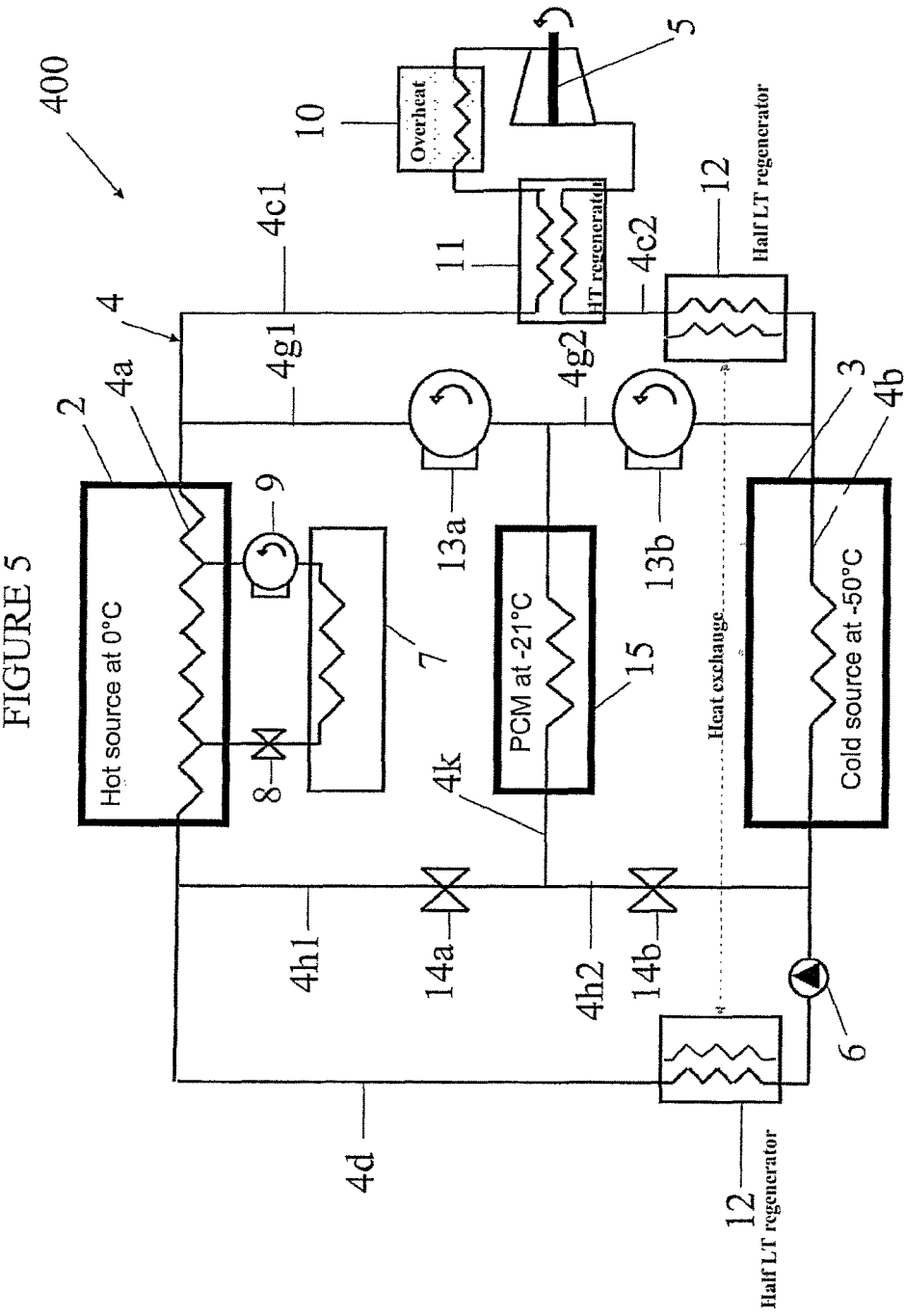
FIG. 5 is a diagram of an electrical energy storage/production system according to a fifth embodiment of the present invention.

The fifth embodiment of the system 400 of FIG. 5 is identical to the embodiment 300 of FIG. 3, and the same elements will be not described, only the differences will be described.

The legs 4g and 4h of FIG. 3 are divided in this embodiment of FIG. 5 into sub-legs 4g1, 4g2 and 4h1, 4h2, respectively.

A leg 4k in parallel to the legs 4a and 4b, passes through a source 15 with an intermediate temperature of −21° C. Compressors 13a, 13b on the legs 4g1 and 4g2, and expansion valves 14a, 14b on the legs 4h1 and 4h2, allow working fluid exchanges between the intermediate temperature source 15 and the hot source 2 on the one hand, and the cold source 3 on the other hand.

As for the embodiment of FIG. 3, the compressors 13a, 13b can be a single element or a group of identical elements in parallel.

The intermediate temperature source 15 is made from PCM, and allows to optimize the heat exchanges during the charge cycle, the discharge cycle remaining unchanged. In this embodiment, the pump 6 may not be reversible.

Figure 6:
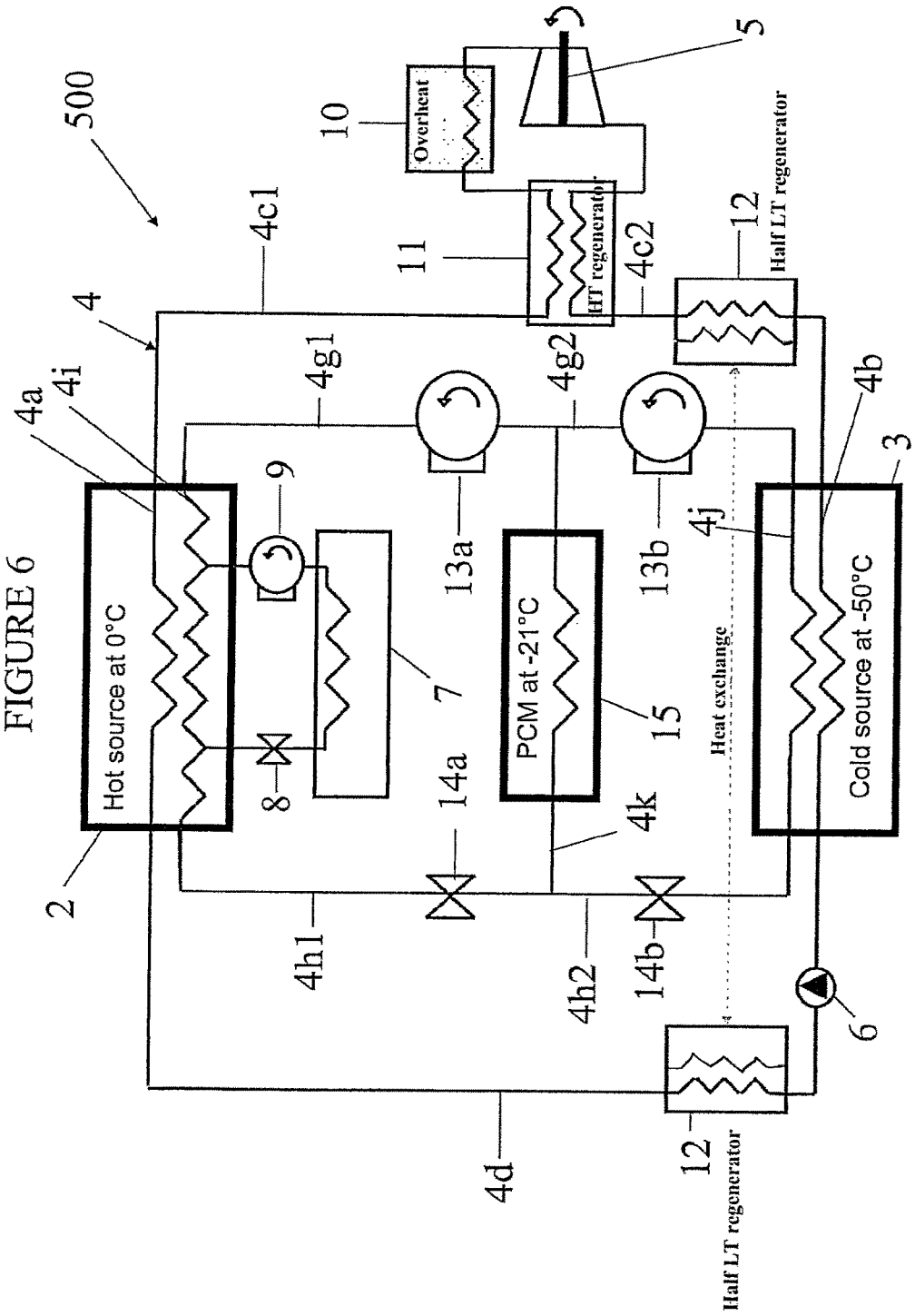
FIG. 6 is a diagram of an electrical energy storage/production system according to a sixth embodiment of the present invention.

FIG. 6 shows a sixth embodiment of a system 500 according to the invention.

The system 500 is a combination of the embodiments of FIGS. 4 and 5, the charge circuit being in parallel to the discharge circuit as in the system 300 of FIG. 4, and the charge circuit having an intermediate temperature source 15 as in the system 400 of FIG. 5.

The operating mode of this system being deduced from the two previous embodiments, it will not be described in more detail here.

In the embodiments of FIGS. 4 and 6, wherein the circuits are in parallel, the working fluid in the two circuits may be identical but two different working fluids may also flow in both circuits, without departing from the scope of the present invention.

The electrical storage capacity of this system is between 11 and 15 kWh/m$^3$ of ice (depending on the overheating temperature).

For example, with a system according to the invention mounted in a sealed chamber in the form of a container, and with a total volume of ice of 50 m$^3$ (hot source+cold source), the amount of electrical energy which may be transferred for use is about 500 kWh, or 0.5 MWh.

The chamber in the form of container allows to make the system according to the invention easily transportable and deployable.

Furthermore, its modularity allows to dimension the storage to local needs by adding several elementary "bricks" (modules).

The invention claimed is:

1. A system for producing and storing electrical energy, comprising a thermally insulated chamber containing a first closed circuitry in which circulates a first working fluid, a hot source through which a first leg of the first circuitry passes for a heat exchange between the first working fluid and the hot source, a cold source through which a second leg of the first circuitry passes for a heat exchange between the first working fluid and the cold source, the hot and cold sources being thermally insulated from each other, the first circuitry further comprising third and fourth legs connecting in series the first and second legs, the third leg comprising a first member for circulating the first working fluid in liquid phase and the fourth leg comprising a second member for circulating the first working fluid in gas phase, wherein the hot source is composed of a pure water ice slurry always at 0° C., the cold source is composed of an ice slurry with a temperature lower than or equal to −40° C. and the system for producing/storing electrical energy further comprises a second circuitry for circulating a second working fluid between the hot source and a constant temperature system outside the thermally insulated chamber, the constant temperature system being selected from the group comprising ambient air, a water reserve, a water stream, a water course, a waterway, wherein the second working fluid is circulated between said constant temperature system and the hot source by an auxiliary expansion valve and an auxiliary compressor, and is caused to exchange heat with the constant temperature system and the hot source; and, wherein the system further comprises an intermediate temperature source at an intermediate temperature between the temperature of the hot source and the temperature of the cold source, and comprises an intermediate fluid circuitry carrying an intermediate working fluid, said intermediate fluid circuitry passing through and exchanging heat with the hot source, the cold source, and the intermediate temperature source, the intermediate temperature source being connected to the intermediate fluid circuitry in parallel to the hot source, by a first sub-leg equipped with a first compressor and a second sub-leg equipped with an first expansion valve, and the intermediate temperature source being connected to the intermediate fluid circuitry in parallel to the cold source, by a third sub-leg equipped with a second compressor and a fourth sub-leg equipped with an second expansion valve.

2. The system according to claim 1, wherein the intermediate temperature source is made of an ice slurry at a temperature between −15° C. and −30° C.

3. The system according to claim 2, wherein the intermediate temperature source is made of an ice slurry at a temperature of −21° C.

4. The system according to claim 1, wherein the first working fluid and the intermediate working fluid are the same working fluid that circulates in the first circuitry and the intermediate fluid circuitry which form a single closed circuit.

5. The system according to claim 1, wherein the first circuitry and the intermediate fluid circuitry are independent.

6. The system according to claim 1, wherein the first fluid circulating member is a reversible pump, and the second circulating member is a reversible turbine.

7. The system according to claim 1, wherein a low temperature regenerator is arranged to enable a heat exchange between the third and fourth legs connected to the cold source.

8. The system according to claim 1, wherein a high temperature regenerator is arranged between portions of the fourth leg entering and exiting the second circulating member.

9. The system according to claim 1, wherein a superheating member providing an external heat is provided on the first fluid circuitry immediately upstream of an input of the second circulating member in the electricity production mode of the second circulating member.

\* \* \* \* \*